Inventors
Frank R. Smith
Joseph Robbins
By their Attorney
Robert E Ross

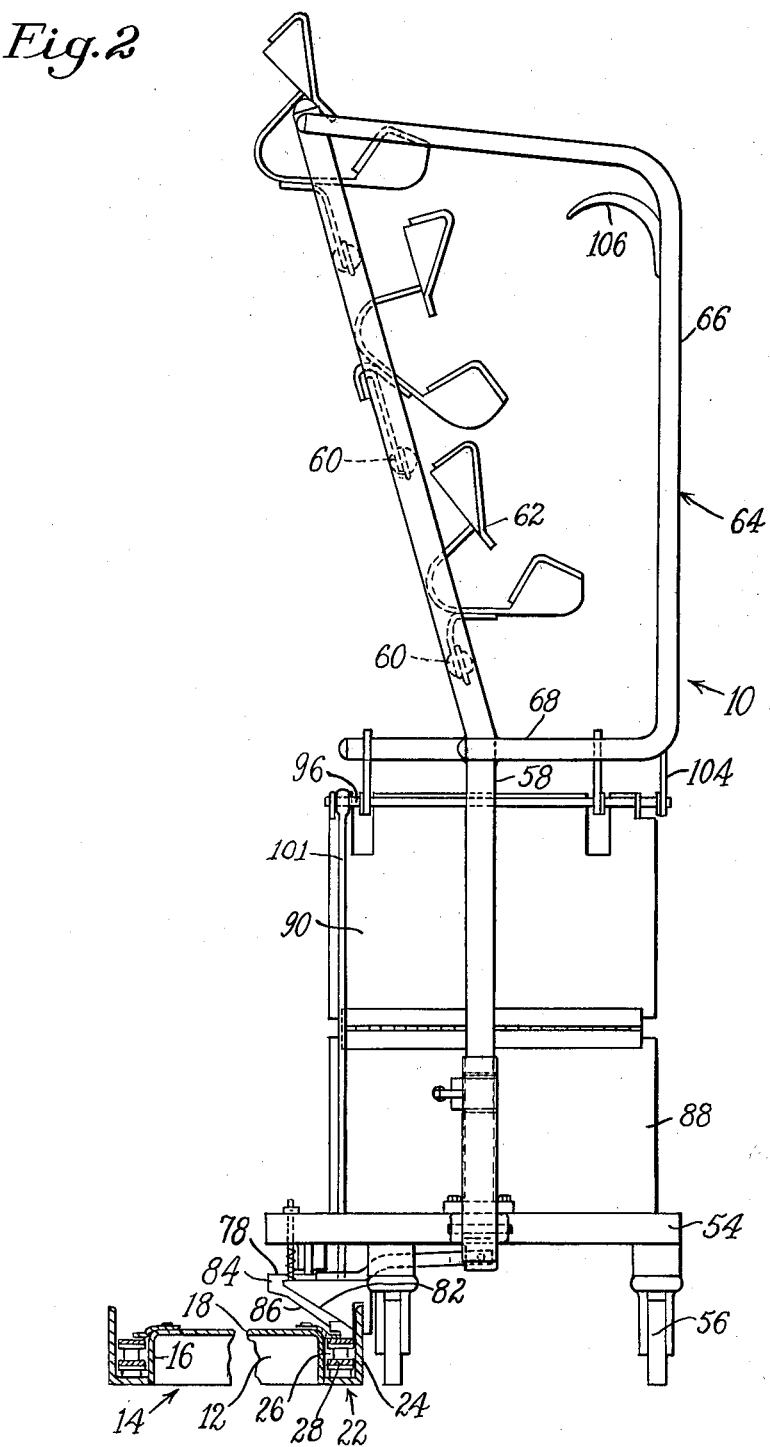

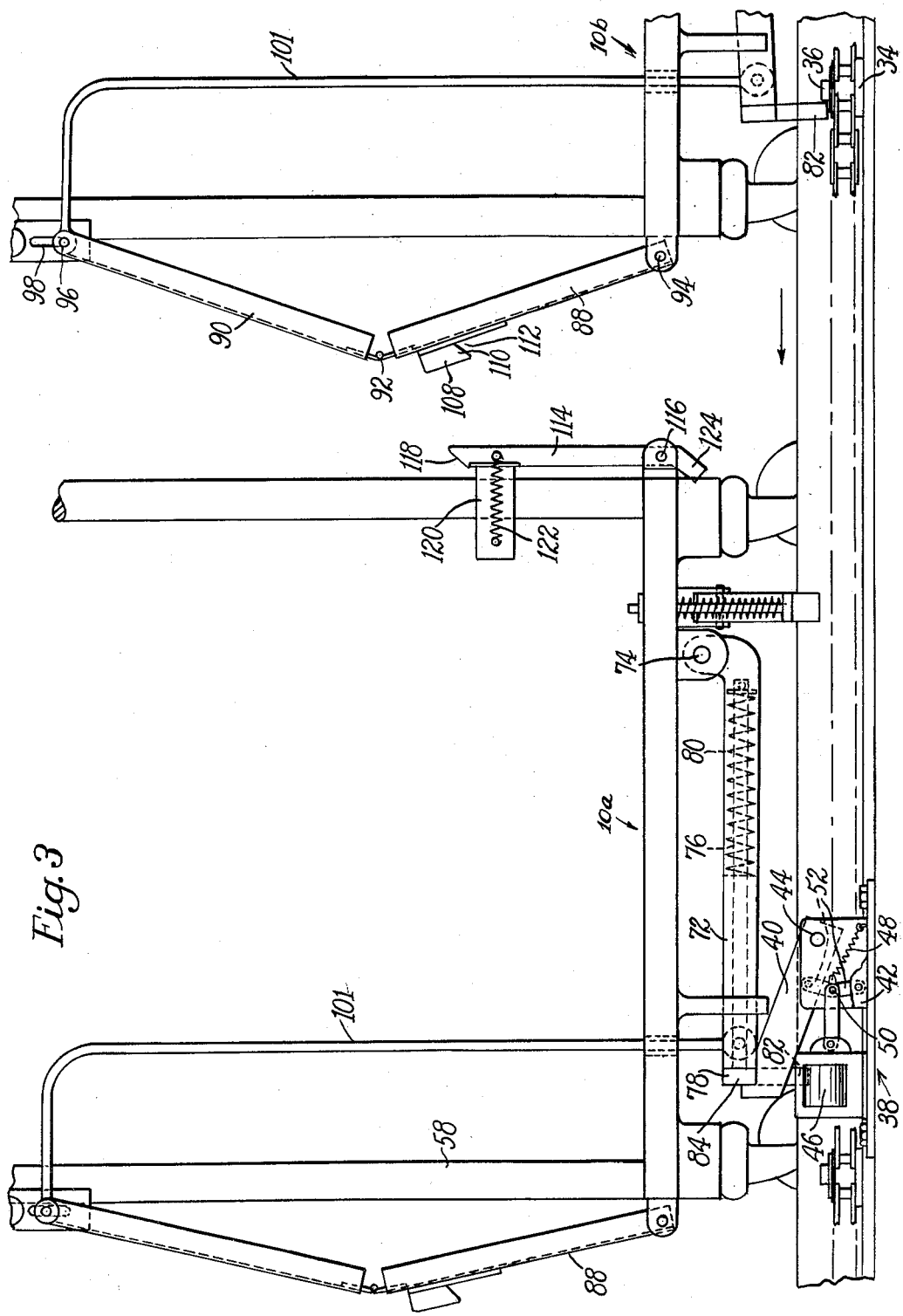

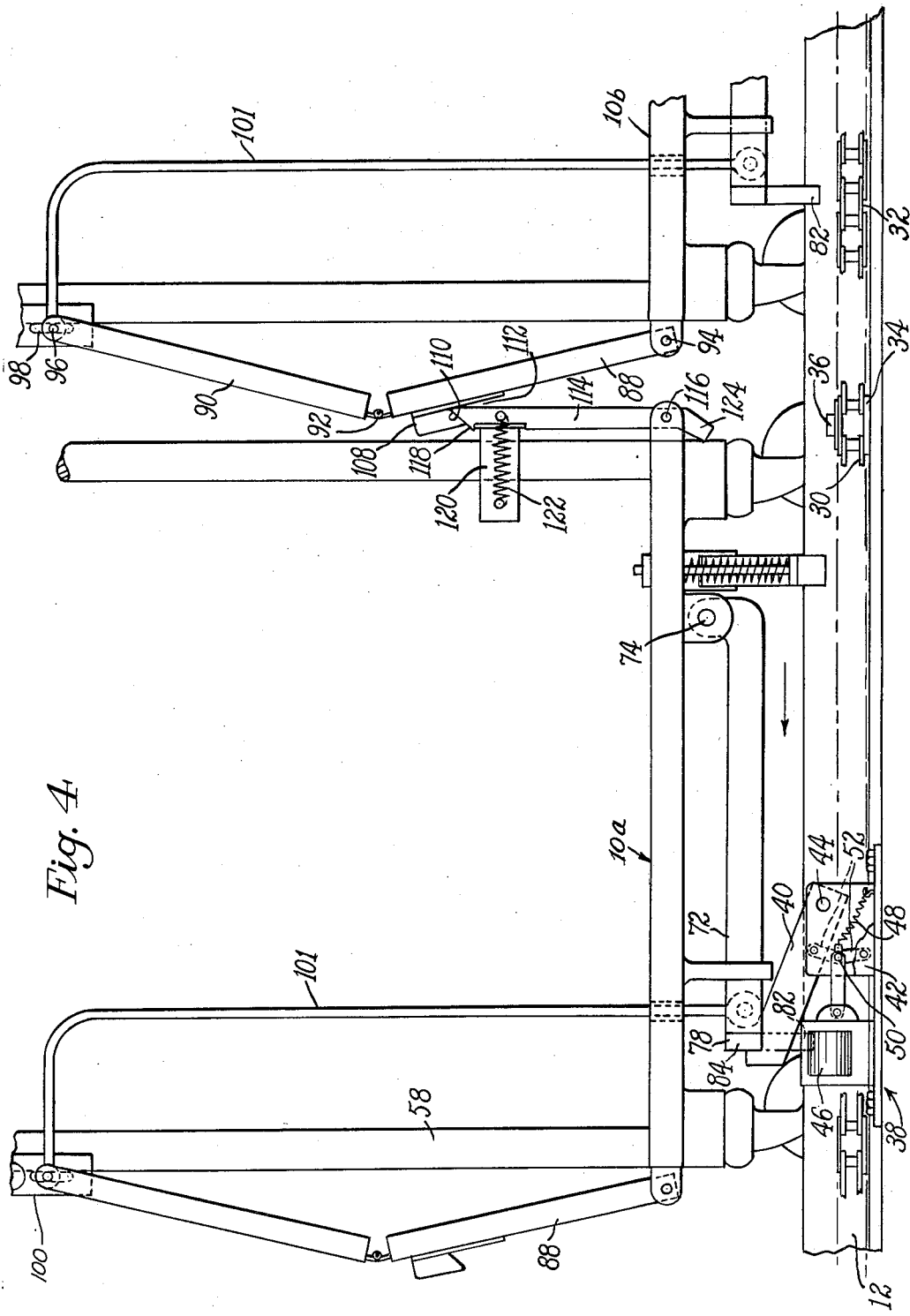

United States Patent Office 3,106,172
Patented Oct. 8, 1963

3,106,172
ARTICLE HANDLING DEVICES
Joseph Robbins and Frank Richard Smith, Leicester, England, assignors to United Shoe Machinery Corporation, Flemington, N.J., a corporation of New Jersey
Filed Apr. 27, 1962, Ser. No. 190,541
Claims priority, application Great Britain Sept. 22, 1961
7 Claims. (Cl. 104—172)

This invention relates generally to article transporting devices, and has particular reference to a rack mechanism adapted for cooperation with a conveyor means to enable the rack to be transported between work stations and to be stopped automatically on arrival at a work station, or to be stopped on engagement with another rack previously stopped at the work station.

In a copending application of Goodrich et al. Serial 158,682, filed December 12, 1961, relating to a conveyor of the type described above there is disclosed an article transporting system, comprising a floor-mounted conveyor chain, with shoe rack mechanisms adapted to be transported between work stations by said chain. Latch means is provided on each rack for engagement with the chain, and means is provided for cooperation with stop means at the work stations to cause the latch to be disengaged from the conveyor chain when the rack arrives at the work station. Means is also provided on the rack for effecting disengagement of the latch when the rack collides with another rack previously stopped at a work station.

Although the system disclosed in said Goodrich et al. application operates satisfactorily in most installations, it has been found that in some cases when a second rack collides with a first rack stopped at a work station, there may be a tendency for the second rack to back away from the first rack. When such movement occurs the latch mechanism of the second rack is permitted to reengage the conveyor chain, which causes the second rack to again collide with the first rack. The second rack thus undergoes an undesirable back and forth movement until the first rack is released and the second rack is permitted to move to the work station.

The object of this invention is to provide a rack for the purpose described which has means for preventing rearward movement of a rack after it has collided with a rack previously stopped at a work station.

A further object of the invention is to provide a rack which has means on the forward end for both disengaging a latch mechanism from a conveyor chain on collision with a similar rack previously stopped at a work station, and for engaging means on the rear end of said previous rack for preventing rearward movement of said rack after said latch mechanism is disengaged from the conveyor chain.

Other objects of the invention will be apparent to one skilled in the art from the following detailed description of a specific embodiment thereof.

In the drawing:

FIG. 2 is a rear plan view of the rack of FIG. 1;

FIG. 3 is a view in side elevation (partly in section), of a first rack stopped at a work station, and a second rack approaching said first rack; and FIG. 4 is a view similar to FIG. 3 in which the second rack has collided with said first rack to become disengaged from the conveyor chain.

Figure 1:
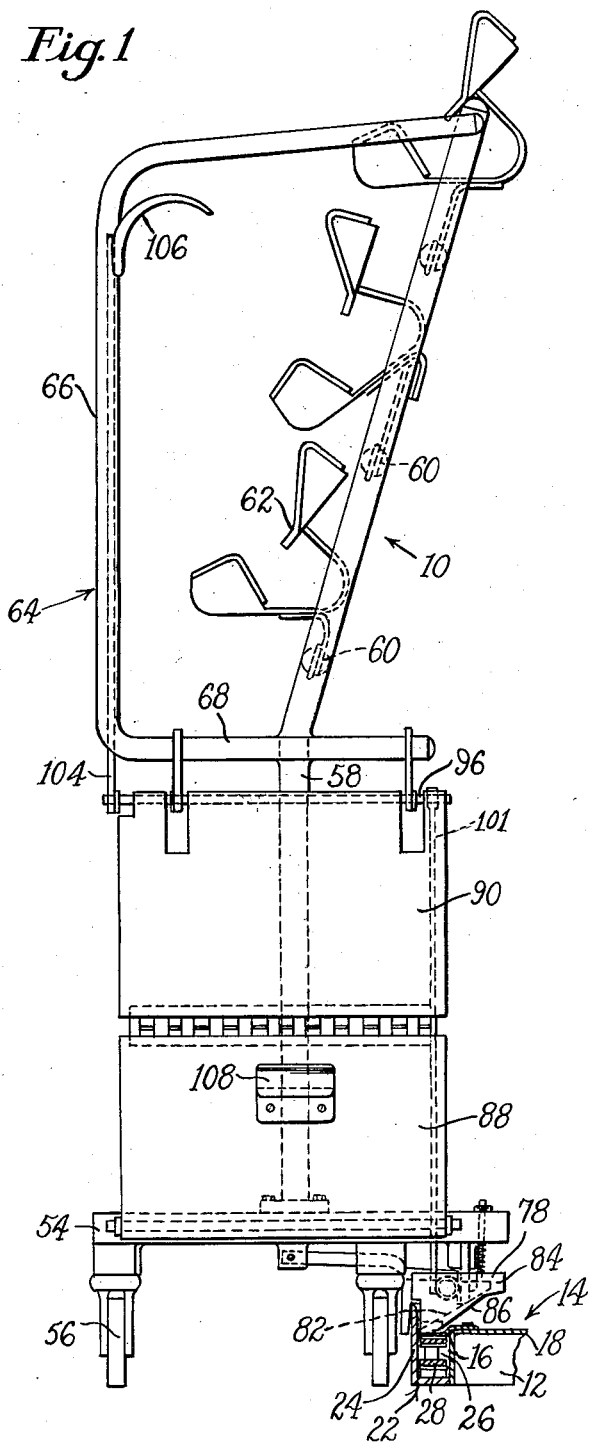
FIG. 1 is a view in front elevation of a rack mechanism embodying the features of the invention.

Referring to the drawing, there is illustrated a rack 10, which is particularly adapted for carrying shoes in the process of manufacture, and is provided with means for enabling the rack to be moved along the floor between work stations by means of conveyor mechanism 12. In the illustrated embodiment, the conveyor mechanism 12 is similar to the mechanism disclosed in the above identified application, comprising a channel member 14 having spaced side walls 16, and a horizontal top portion 18. Mounted adjacent each side wall is an angle member 22 having an upstanding flange 24 spaced from the adjacent side wall 16, forming channels 26. Disposed in the channels 26 is an endless conveyor chain 28 which is driven continuously at a uniform speed by any suitable means (not shown) so that the chain travels in the direction indicated by the arrows (see FIGS. 3 and 4).

The chain 28 comprises links 30 joined by connecting members 32 with each link having a support block 34 disposed on the lower side and an upwardly extending pawl 36 for cooperation with a latch mechanism on the racks 10 in a manner to appear hereinafter.

To control the movement of the racks by the conveyor, various types of stop devices may be disposed along the conveyor mechanism, preferably so positioned to project upwardly from the top surface 18 of the channel member 14. Although in the above identified application several types of stop members are disclosed, for the purpose of the present invention it will be sufficient to illustrate a single type of stop member 38 which may be used at either a work station or a pool position. The stop member 38 comprises a stop arm 40 pivoted to a support bracket 42 by a pin 44 at the upstream end thereof, and is pivotally movable about said pin between a stop position, in which the arm is inclined upwardly, and a pass position in which the arm extends in a generally horizontal direction. The arm 40 is moved between these two positions by means of a solenoid 46 and a spring 48 which are connected by suitable linkage to the knee 50 of a toggle 52. One end of the toggle is secured to the bracket 42 and the other end is secured to the arm 40. With the solenoid energized the toggle is maintained in the position shown in FIG. 3 so that the arm 40 is held in the upwardly inclined stop position. When the solenoid is de-energized the spring 48 moves the arm 40 downwardly to the horizontal or pass position.

The rack 10 comprises a base 54 having casters 56 mounted therein. Extending upwardly from the base is a tubular frame 58 having cross members 60 extending therebetween on which are mounted individual shoe retainers 62. To facilitate manual movement of the racks into and out of operative relationship with the conveyor, forwardly extending handle members 64 are secured to the frame 58 at each end of the rack, each member 64 having a vertical portion 66 and a lower horizontal portion 68 joined to the frame.

To provide means for engagement of the conveyor chain 28 with the rack when the rack is in operative relationship to the conveyor, and to provide means to be actuated by the stop device to disengage the rack from the conveyor, a conveyor engaging mechanism is disposed on the rear side of the rack below the base 54, which comprises a hollow support arm 72 joined to the base at pivot 74 and extending toward the forward end of the rack. Assembled within the arm 72 is a rod 76 having a latch plate 78 disposed on the end thereof. In the illustrated embodiment the rod 76 is resiliently mounted in the arm by means of a spring 80 extending between the innermost portion of the rod and the outer end of the arm, so that the rod and latch plate are normally biased into the arm, but may be extended therefrom against the force of the spring when the latch plate engages the conveyor chain. When the rack is disposed in operative relationship to the conveyor, the latch plate 78 is disposed above the conveyor chain, in position for engagement with the pawls 36 of the chain, and for actuation by the various stop members previously described. To this end the latch plate 78 is provided with a downwardly projecting portion 82 for engagement with a chain pawl when the latch plate is in the lowered position, a laterally extending portion 84 adapted for engagement with the stop members in a manner to appear hereinafter, and an inclined camming portion 86 extending therebetween.

To provide means for automatically disengaging the latch plate 78 from the conveyor chain when a rack being conveyed collides with another rack which has been arrested by the stop member, the forward end of each rack is provided with a bumper, which comprises a pair of forwardly inclined plates 88 and 90 hinged together at 92. The lower plate 88 is connected to the rack base 54 at pivot 94, and the upper plate has a transverse rod 96 slidably disposed in slots 98 in guide members 100 mounted on the lower horizontal portion 68 of the handle. A control rod 101 extends between the rod 96 and the arm 72, so that upward movement of the rod 96 causes the latch plate 78 to move upwardly out of engagement with the conveyor chain. To provide manual means for disengaging the latch plate from the conveyor, a rod 104 extends upwardly from the upper end of the upper bumper plate 90, with a hand grip 106 disposed on the upper end thereof, said rod 104 being slidably mounted in the vertical portion 66 of the handle 64.

To provide means for preventing a second rack from backing away after collision with a rack previously stopped at a work station, means is provided on the bumper mechanism of the rack for latching engagement with cooperating means on the rear of a similar rack. For this purpose the lower bumper plate 88 of each rack is provided with a catch member 108 mounted on the forward side, said catch member having a lower surface 110 which projects forwardly and downwardly forming a recess 112.

The rear end of each rack is provided with a latching arm 114 which is pivoted to the rack frame at hinge 116 and extends generally vertically terminating in an upper end which has a forwardly and downwardly inclined upper surface 118, which is adapted to seat in the recess 112 as will appear hereinafter. The latching arm 114 is capable of a limited amount of pivotal movement about hinge 116, and is normally biased forwardly against a stop member 120 by means of a spring 122. During one portion of the operation of the device as will appear hereinafter, the latching arm 114 is required to pivot rearwardly against the force of the spring. The amount of such rearward pivoting is limited by an extension 124 on the arm 114 which projects downwardly and forwardly from hinge 116, and is positioned to contact an adjacent portion of the rack base when the arm has pivoted rearwardly the desired distance.

The operation of the conveyor latching mechanism may be best described by reference to FIGS. 3 and 4. As illustrated therein, a rack 10a may be stopped at a stop position, which may be a work station on a pool position, by the action of the stop arm 40 in camming the latch plate 78 upwardly and effecting disengagement of the downwardly extending portion 82 from the conveyor chain.

As a second rack 10b is being conveyed by the chain toward the first rack, the weight of the bumper plates causes them to assume their foremost position, with the rod 96 disposed in the bottom of the slots 98, and the latch plate 78 disposed in its lowermost position for engagement by a pawl 36 of the conveyor chain. As the second rack 10b collides with the first rack 10a, the engagement of the catch 108 with the latch arm 114 causes the plate 88 to move rearwardly in relation to the frame of the second rack, so that the transverse rod 96 and the control rod 101 move upwardly to effect disengagement of the latch plate of rack 10b from the conveyor chain. As the lower bumper plate 88 pivots rearwardly the catch member 108 swings upwardly until it is able to pass over the top of the latching arm 114, so that the end of the latching arm seats in the recess 112. The bumper plates are thereby retained in the rearward position, so that the second rack is kept from backing away from the first rack, and the latch plate is maintained out of engagement with the conveyor chain (see FIG. 4).

When the stop member 38 is actuated to permit the latch plate of the first rack to re-engage the conveyor chain, the first rack moves forwardly. The forward motion of the first rack, and the inertia of the second rack, causes the arm 114 to pivot rearwardly against the force of the spring, so that the end of the arm becomes disengaged from the catch 108. After such disengagement the bumper plates return to their original foremost position, permitting the latch plate of the second rack to re-engage the conveyor. The second conveyor then moves forwardly. Meanwhile, if it is desired that the second rack be arrested at the stop member, the stop arm 40 may be returned to its upwardly inclined stop position, so that it is in position to cam the latch plate of the second rack out of engagement with the conveyor chain.

Although in the illustrated embodiment the rack 10 is particularly adapted for transporting shoes in the process of manufacture, it will be understood that racks embodying the features of the invention may be adapted for carrying any desired article.

Since certain other obvious changes may be made in the device illustrated herein without departing from the scope of the invention, it is intended that all matter contained herein be interpreted in an illustrative and not a limiting sense.

Having thus described our invention, what we claim as new and desire to secure by Letters Patent of the United States is:

1. An article carrying device for co-operation with a conveyor chain of the type described, comprising conveyor chain engaging means movable between engaging and non-engaging positions, means on the forward end of said device responsive to a collision with the rear end of a similar device for moving the chain engaging means to the non-engaging position, and means responsive to said collision to retain said devices connected together and to retain said chain engaging means in the non-engaging position.

2. A rack for co-operation with a conveyor chain of the type described, comprising conveyor chain-engaging means movable between engaging and non-engaging positions, bumper means on the forward end of said rack, said bumper means being responsive to collision with the rear end of a similar rack to move the conveyor chain engaging means to the non-engaging position, the front and rear ends of said rack having means for engagement with co-operating means on the rear and front ends, respectively, of similar racks to latch together racks that have collided and to retain the conveyor chain-engaging means in the non-engaging position.

3. A rack for cooperation with a conveyor chain of the type described comprising conveyor chain engaging means movable between engaging and non-engaging positions, co-operating latch portions on the front and rear of said rack to effect latching engagement between racks which have collided, said co-operating latch means having means for moving said conveyor chain-engaging means to the disengaging position when two of said racks have collided and for retaining it in said position until said racks have been disengaged.

4. A rack for co-operation with a conveyor chain of the type described comprising conveyor chain engaging means movable between engaging and non-engaging positions, a bumper on the front end of said rack, said bumper being movable rearwardly relative to the rack on collision of the rack with the rear end of a similar rack, means responsive to rearward movement of said bumper to move said conveyor chain-engaging means to the non-engaging position, latch means on said bumper, and co-operating latch means on the rear of said rack, said front and rear latch means being adapted to engage rear and front latch means, respectively, of a similar rack, said front and rear latch means being adapted, on collision of the front of one rack with the rear of another rack to engage in a manner so as to latch said racks together and to maintain said chain-engaging means in the non-engaging position.

5. A rack for co-operation with a conveyor chain of the type described, comprising conveyor chain-engaging means movable between engaging and non-engaging positions, a bumper on the front end of said rack, said bumper being pivoted to the rack at a lower portion and normally extending upwardly and being inclined forwardly, said bumper being adapted to pivot rearwardly in relation to the rack on collision with the rear end of a similar rack, means responsive to said rearward pivoting to move the conveyor chain-engaging means to the non-engaging position, the rear end of said rack having means adapted resiliently to engage the bumper of a following rack which has collided therewith so as to retain it in the rearwardly pivoted position.

6. A rack for cooperation with a conveyor chain of the type described comprising conveyor chain engaging means movable between engaging and non-engaging positions, a front latch member mounted on the front of said rack, said latch member being pivoted to the rack at its lower end and being normally inclined upwardly and forwardly therefrom and being adapted to swing upwardly and rearwardly on collision with the rear of another rack, means responsive to said swinging of the front latch to move the chain engaging means upwardly to the non-engaging position, and a rear latch member mounted on the rear end of said rack, said rear latch member comprising an upwardly extending arm pivoted at the lower end and resiliently biased forwardly to an upright position, said arm having a portion positioned to engage the front latch of a similar rack on collision therewith and thereby maintain said front latch in a position in which said chain-engaging means is retained in the non-engaging position.

7. A rack for cooperation with a conveyor chain of the type described, said rack comprising conveyor chain-engaging means movable between engaging and non-engaging positions and having front and rear latch members which are pivoted to the rack and extend generally upwardly, said rear latch member being resiliently biased forwardly to an upright position and having an upwardly facing latch portion, said front latch member being normally inclined forwardly and being adapted to swing upwardly and rearwardly on collision with the rear end of a similar rack and having catch means adapted to hook over the upwardly facing latch portion of the rear latch in a similar rack when said upward and rearward swinging occurs, whereby said front latch is retained in engagement with the rear latch portion, means responsive to said movement of the front latch member to move the conveyor chain engaging means to the non-engaging position, said rear latch member being resiliently pivotable rearwardly and downwardly to effect disengagement of said latch members when a front rack is moved away from a rear rack which has been latched thereto.

References Cited in the file of this patent

UNITED STATES PATENTS

| | | |
|---|---|---|
| 2,619,370 | Leger | Nov. 25, 1953 |
| 3,044,416 | Reibel et al. | July 17, 1962 |